United States Patent
Doat et al.

(10) Patent No.: US 7,553,510 B2
(45) Date of Patent: *Jun. 30, 2009

(54) STABLE HOMOGENEOUS EMULSIFIER-FREE SUSPENSION, ITS METHOD OF PREPARATION AND USE IN FOOD COMPOSITIONS

(75) Inventors: Stephane Doat, Chatenay Malabry (FR); Ricardo Weill, Pcia de Buenos-Aires (AR)

(73) Assignee: Compagnie Gervais Danone, Levallois-Perret (FR)

( * ) Notice: Subject to any disclaimer, the term of this patent is extended or adjusted under 35 U.S.C. 154(b) by 564 days.

This patent is subject to a terminal disclaimer.

(21) Appl. No.: 10/638,431

(22) Filed: Aug. 12, 2003

(65) Prior Publication Data

US 2004/0028795 A1  Feb. 12, 2004

Related U.S. Application Data

(62) Division of application No. 09/623,421, filed as application No. PCT/FR99/00496 on Mar. 4, 1999, now Pat. No. 6,627,245.

(30) Foreign Application Priority Data

Mar. 5, 1998 (FR) .................................. 98 02707

(51) Int. Cl.
 *A23D 7/00* (2006.01)
(52) U.S. Cl. ...................................... 426/602; 426/601
(58) Field of Classification Search .................. 426/602
 See application file for complete search history.

(56) References Cited

U.S. PATENT DOCUMENTS

| 4,160,850 | A | | 7/1979 | Hallstrom |
| 4,195,084 | A | | 3/1980 | Ong |
| 4,588,717 | A | | 5/1986 | Mitchell |
| 4,604,281 | A | | 8/1986 | Deckner |
| 4,705,875 | A | | 11/1987 | Mitchell |
| 5,244,887 | A | | 9/1993 | Straub |
| 5,502,045 | A | | 3/1996 | Miettinen |
| 6,129,944 | A | | 10/2000 | Tiainen |
| 6,139,897 | A | * | 10/2000 | Goto et al. .................. 426/601 |
| 6,162,483 | A | | 12/2000 | Wester |
| 6,174,560 | B1 | | 1/2001 | Miettinen |
| 6,627,245 | B1 | * | 9/2003 | Doat et al. .................. 426/602 |

FOREIGN PATENT DOCUMENTS

| EP | 0 092 076 | 10/1983 |
| FR | 2 240 717 | 3/1975 |
| JP | 56 042546 | 4/1981 |
| SU | 794 018 | 1/1981 |
| WO | WO 92/19640 | 11/1992 |

OTHER PUBLICATIONS

Lowe, 1937. Experimental Cookery $2^{nd}$ edition. John Wiley & Sons, London. p. 2-3.

* cited by examiner

*Primary Examiner*—Carolyn A Paden
(74) *Attorney, Agent, or Firm*—Young & Thompson

(57) ABSTRACT

The invention concerns a stable homogeneous emulsifier-free suspension of at least one hydrophobic substance and/or a substance whereof the melting point is higher than about 130° C., and a thickening agent, in an aqueous medium. Said suspensions can be used in food compositions, in particular based on milk and milk derivatives.

Figure 1:
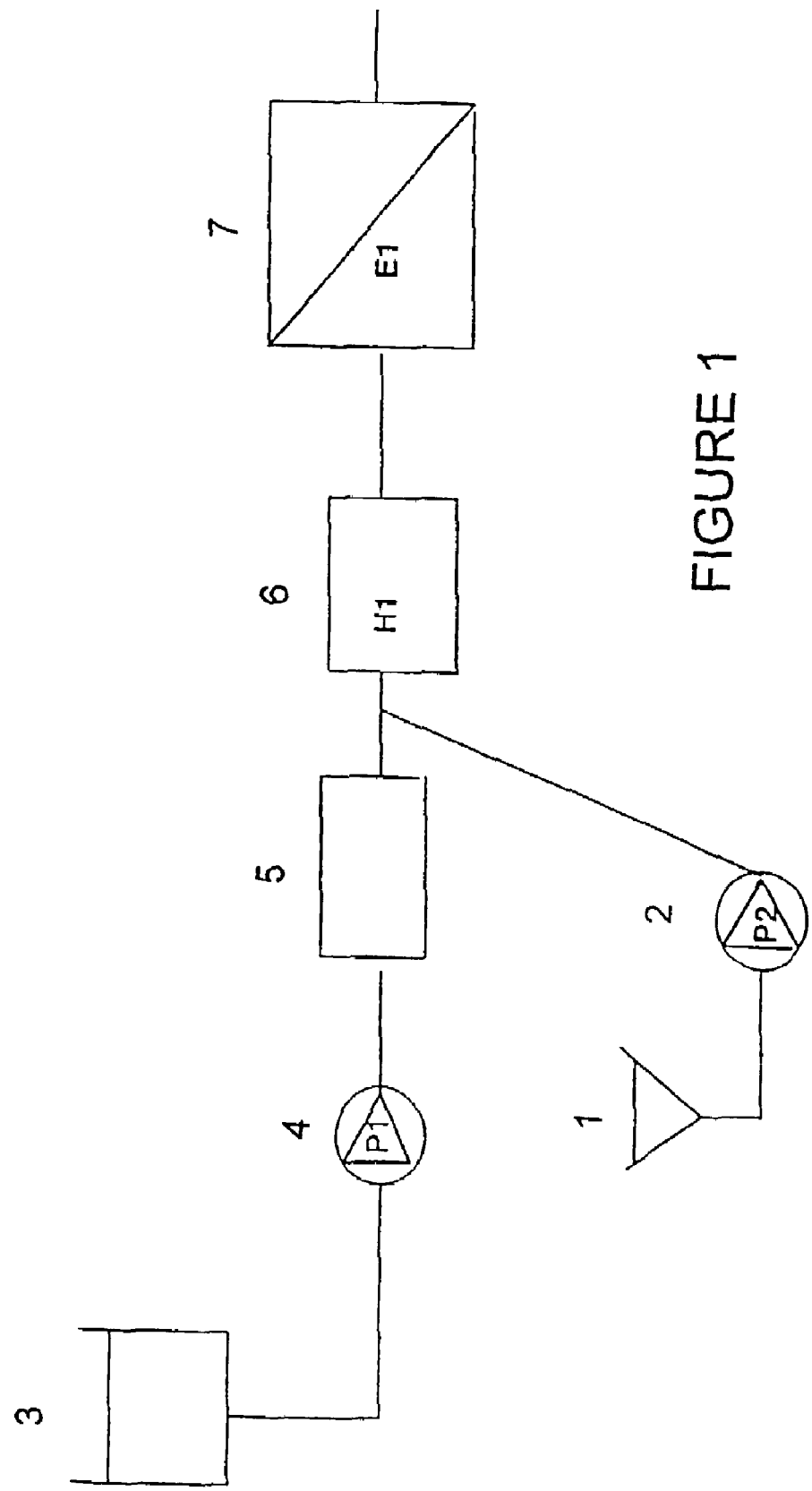

16 Claims, 1 Drawing Sheet ns are
STABLE HOMOGENEOUS EMULSIFIER-FREE SUSPENSION, ITS METHOD OF PREPARATION AND USE IN FOOD COMPOSITIONS This application is a Divisional of U.S. patent application Ser. No. 09/623,421 filed on Nov. 20, 2000 now U.S. Pat. No. 6,627,245. Application Ser. No. 09/623,421 is the national phase of PCT International Application No. PCT/FR99/00496 filed on Mar. 4, 1999 under 35 U.S.C. § 371. The entire contents of each of the above-identified applications are hereby incorporated by reference.

BACKGROUND OF THE INVENTION

1. Field of the Invention

The present invention concerns the incorporation of high melting point and/or hydrophobic products, notably endowed with significant biological activity, in compositions with a high water content.

More particularly, the invention relates to a stable homogeneous suspension, of high melting point and/or hydrophobic products, notably phytosterols, and to its application in the preparation of food compositions, such as dairy products.

2. Description of the Related Art

In fact, the improvement of the nutritional properties of products for food use, can lead to the incorporation of small quantities of ingredients with a favourable effect on the metabolism; however, the organoleptic and microbiological characteristics of the products must be protected.

Amongst the substances with biological activity, phytosterols and their derivatives have particular significance because of their physiological and pharmacological properties; in fact, it has been shown that of these compounds certain ones have a hypocholesterolemic activity when they are absorbed in a regular manner. It has thus been advocated to prepare the sterols in an appropriate quantity to use them for nutritional ends, with a view to lowering the level of cholesterol in the bloodstream. These sterols are especially obtained from unsaponifiable elements resulting from the saponification of animal and vegetable fats and oils.

The two main approaches considered to date for the incorporation of phytosterols and their derivatives in food or pharmaceutical compositions necessitate the solubilisation of phytosterols and their derivatives in the lipidic phases of a high fat content environment, the level of fat however being higher than 20%, and/or the use of emulsifying agents.

Several publications have thus described the incorporation of these compounds into compositions with a high fat content.

International application WO92/19640 describes food products containing β-sitostanol esters and fat at a level higher than 50%.

The Japanese patent application n° 2.299.548 describes a biscuit containing phytosterols and its manufacturing process, either by use of an oil enriched with β-sitosterol mixed with flour before mixing in the other ingredients, or by prior mixing of the phytosterols with egg white before the introduction of the other ingredients.

However, it would be preferable to incorporate them in foodstuffs with a reduced fat content and with recognised nutritional qualities, such as fermented or unfermented dairy products. Such an inclusion causes difficulties inherent to the physico-chemical characteristics of phytosterols and to constraints unique to these types of food products, generally classed as fresh products.

U.S. Pat. No. 3,085,939 describes pharmaceutical compositions containing sitosterol which are stabilised by the presence of emulsifiers and a colloid material avoiding contact between the sitosterol and oil.

U.S. Pat. No. 4,195,084 describes pharmaceutical compositions containing sitosterols whose taste and stability are made acceptable by the combined presence of a chelating agent, carboxymethyl-cellulose, sorbitol, emulsifier and simethicone.

Resorting to such additives is unacceptable in products for food use, consumed in large quantities by healthy subjects.

However, as mentioned above, the incorporation of high melting point and/or hydrophobic substances, in finished dairy products with a high water content and low fat content, whilst preserving their properties, without resorting to these additives causes technical problems which to date have not been resolved.

In fact, it is not currently possible to incorporate hydrophobic substances with a high melting point at the beginning of the manufacturing process of a dairy product with a high water content and a low fat content. On one hand, their hydrophobic nature prevents them from dissolving in the initial essentially aqueous mixture, and, on the other hand, their melting point is higher than the temperature generally encountered in the preparation processes of dairy products and does not allow them to melt. A problem of heterogeneous distribution in the dairy product in question then has to be confronted.

Furthermore, these hydrophobic substances with a high melting point are generally presented in the form of a powder with large granulometry. Their inclusion, at the end of the preparation process of the dairy product with high water content and low fat content, therefore cannot be envisaged, as it would lead to a gritty sensation in the mouth due to the size of the powder particles. In addition, problems of microbiological contamination risk being confronted.

SUMMARY OF THE INVENTION

In an unexpected manner, it has now been found that such compositions, with satisfactory organoleptic and microbiological characteristics, can be obtained without the additives required in the previous technique, notably emulsifiers.

One of the aspects of the invention is to propose new food compositions without emulsifiers, containing a high water content, a low fat content, and hydrophobic substances and/or with a melting point higher than about 130° C. Favourably, the fat content is lower than about 20%.

Another aspect of the invention is to propose stable homogenous suspensions, without emulsifiers, containing hydrophobic substances and/or with a melting point higher than about 130° C., in an aqueous medium which can serve as an intermediary in the preparation of the invention food compositions.

That is why, the present invention has as its object a stable homogenous suspension without emulsifier, of at least one hydrophobic substance, and/or whose melting point is higher than about 130° C., and a thickener, in an aqueous medium.

It has been noticed that the thickener gives the aqueous solution a viscosity making it possible to maintain the particles of a hydrophobic substance and/or whose melting point is higher than about 130° C. in suspension with homogenous distribution.

DETAILED DESCRIPTION OF THE PREFERRED EMBODIMENTS

Amongst the hydrophobic substances and/or whose melting point is higher than 130° C., phytosterols, phytostanols and their corresponding esterified derivatives can be cited, and compounds chosen from amongst: 5,7,22-cholestatrienol, 7-dehydrocholesterol, 22-dehydrocholesterol, 24-dehydrocholesterol, zymosterol, $\Delta^7$-cholesterol, 7-coprostenol, cholestanol, coprostanol, epicoprostanol, cerebrosterol, 22-α-oxycholesterol, 22-dihydroerogosterol, 7,24(28)-erogostadienol, campesterol, neospongosterol, 7-ergostenol, cerebisterol, corbisterol, stigmasterol, focosterol, α-spinasterol, sargasterol, 7-dehydrocryonasterol, poriferasterol, chondrillasterol, β-sitosterol, cryonasterol, (γ-sitosterol), 7-stigmasternol, 22-stigrnastenol, dihydro-γ-sitosterol, β-sitostanol, 14-dehydroergosterol, 24(28)-dehydroergosterol, ergosterol, brassicasterol, 24-methylenecholesterol, ascosterol, episterol, fecosterol, 5-dihydroergosterol, and their mixtures and especially β-sitostanol, β-sitosterol, β-sitostanol ester, campesterol and brassicaterol.

The particle size of the sterols used is about 60 μm to about 1 mm, and generally 85% of the particles have a granulometry of between 90 and 185 μm.

Within the framework of the invention, β-sitosterol or β-sitostanol are favourably used.

By thickener, is defined a family of food ingredients generally used as technological additives in order to increase the viscosity of the medium.

These ingredients are generally hydrophilic polymers which, when they are introduced into an aqueous medium, are capable of absorbing water and therefore increase volume, thus developing the viscosity.

In the stable homogenic suspensions of the invention, the hydrophobic substance and/or of which the melting point is higher than about 130° C., cannot play the role of emulsifier as it is in suspension in the aqueous phase.

According to a favourable method of carrying out the process of the invention, the thickening agent is in concentration so the viscosity of the suspension is about 0.05 Pas to about 0.15 Pas, especially about 0.05 Pas to about 0.1 Pas.

The viscosity can be measured by methods known to a expert and especially by a 108 rheometer (Gontraves Brand) to a cut of $1290\ s^{-1}$.

Concerning the viscosity, if it is lower than 0.05 Pas, the solution does not have enough viscosity to hold up the particles of the hydrophobic substance and/or of which melting point is higher than 130° C., especially phytosterols, in suspension.

If the viscosity is higher than 0.15 Pas, the solution becomes viscous and pouring cannot be guaranteed.

As thickener, Xanthan gum, carrageenans, pectin, starch, especially gelatinised, gelane gum, or cellulose and its derivatives can be chosen.

According to a favourable method of implementation, the invention concerns an aqueous suspension like the one described above, containing about 0.01% (p/v) to about 10% (p/v) of thickener and about 0.1% (p/v) to about 30% (p/v) of hydrophobic substance and/or of which melting point is higher than about 130° C.

According to another method of implementation, the aqueous solution of the invention contains about 0.5 to about 20% (p/v) of hydrophobic substance and/or of which melting point is higher than about 130° C.

According to another favourable method of implementation, the aqueous solution of the invention contains lipids in a quantity lower than about 5%.

It can be worthwhile to add the lipids when the hydrophobic substance and/or of which the melting point is higher than 130° C. is present in a quantity higher than about 2%, which helps to homogenise the suspension and make it more easily pumped.

The invention equally concerns a preparation process of a stable homogeneous suspension as described above, in which:
  a solution with a viscosity of about 0.05 Pas to about 0.15 Pas, is prepared by mixing an aqueous solution with a thickener,
  the viscous solution obtained at the previous stage is added to a hydrophobic substance and/or the melting point of which is higher than about 130° C., in such a concentration that the concentration in the viscous solution is about 0.1% to about 30% p/V, to obtain a stable homogeneous suspension.

As an illustration of the preparation process of the stable homogeneous solution described above, a thickener is added into hot water (50-60° C.) to obtain a solution with a viscosity of between 0.05 Pas (lower limit to keep it in suspension) and 0.15 Pas (upper limit to guarantee pouring). The viscosity is measured on a 108 rheometer to a cut of $1290\ s^{-1}$. Phytosterol powder is added progressively by manual stirring or with the aid of a mixer 50-100 RPM taking care not to incorporate air. The structure created by the molecules of thickener and the viscosity of the aqueous solution make it possible to keep the phytosterol particles in suspension with homogeneous diffusion.

The stable homogeneous suspensions of the invention are favourably used in new food compositions.

Consequently, the invention equally concerns a food composition substantially low in emulsifier, in which the water content is at least 60%, comprising a stable homogeneous suspension as described above, on the basis of about 0.5% to about 30% especially on the basis of about 1% to about 25%, and a fluid composition containing at least 60% water and not containing more than about 18% fat, on the basis of about 75% to about 99.5%.

As an example, in a food composition containing about 99.5% fluid composition, the fat content of which is about 18%, the level of fat in the food composition is about 17.9%, which corresponds well to a fat content lower than about 20%. However, the fat level of the fluid composition will be varied according to the quantity of aqueous suspension. For example, about 25% of aqueous suspension will be mixed with about 75% fluid composition containing less than 27% of fat to obtain a food composition whose final fat content is less than about 20%.

The percentages are percentages in weight.

In a favourable food composition according to the invention, the stable homogeneous suspension described above is present on the basis of about 0.5% to about 20%.

In the following, the fluid composition is equally designated by "mix".

According to a favourable method of implementation of the invention, in the food compositions of the invention, the content in hydrophobic substance and/or of which melting point is higher than about 130° C. is about 0.001 to about 7.5%, especially about 0.4% to about 2%.

In a favourable food composition according to the invention, the content in hydrophobic substance and/or of which melting point is higher than about 130° C., is about 0.05 to about 4%.

According to a favourable method of implementation, the food compositions of the invention contain proteins in a quantity lower than about 10%, especially at about 4%.

According to another favourable method of implementation of the invention, the food compositions of the invention contain carbohydrates on the basis of about 4 to about 20%.

According to another favourable method of implementation of the invention, the food compositions of the invention are devoid of the following agents: chelating agents, agents likely to inhibit fermentation and preservatives.

To clarify, the compositions of the invention are favourably low in chelating agent, sodium carboxymethylcellulose, surfactant agent and simethicone.

According to another favourable method of implementation of the invention, the food compositions of the invention are such that the fluid composition is mainly made up of milk or its derivatives such as lactoserum, of animal or vegetable origin.

As an example, soya milk, almond milk or a liquid vegetable preparation obtained from cereals (oats, rice, barley) can be cited.

The food compositions can favourably contain lactic bacteria.

The invention equally concerns any food composition devoid of emulsifier, containing less than about 20% and preferably less than about 18% fat, and about 0.001 to about 7.5%, preferably about 0.05 to about 4%, and more especially about 0.005 to about 2.5% of substance of which melting point is higher than about 130° C. and/or is hydrophobic, chosen notably from phytosterols, phytostanols and their respective esterified derivatives.

One such food composition has characteristics like those described above and requires the stable homogeneous suspension, but it can equally be obtained by other methods without this stable homogeneous suspension playing a part.

The invention equally concerns a preparation process of a food composition comprising the following stages:
- a stable homogeneous suspension is prepared by mixing an aqueous solution, a hydrophobic substance and/or having a melting point higher than about 130° C., and a thickener,
- the stable homogeneous solution is mixed with a liquid composition the water content of which is at least 60% and not containing more than about 18% fat, at a temperature of about 60° C. to about 80° C.,
- the mixture obtained at the previous stage is subjected to homogenisation at a pressure of about 50 to about 500 bars to obtain stable homogenised dispersion in which the particles making up the hydrophobic substance and/or of which melting point is higher than about 130° C., are ground to a size of about 50μ to about 100μ.

The suspension is mixed with a liquid composition (mix) during the heat treatment stage, just before the homogenisation stage. In fact, this stage leads to a sufficient reduction of particles (on average 70 μm) to overcome the organoleptic problems encountered up until now with this type of compound. Moreover, their lower granulometry allows them to remain in suspension after heat treatment in the mix made up for example by a slightly thickened milk. According to a favourable method of implementation, the liquid composition (mix) consists of 95% skimmed milk, 3% skimmed milk powder, 2% modified starch.

The suspension is pumped via a positive (PCM type) pump, or via a high pressure pump, then injected in the production line before the homogenisation stage. Two circuits join therefore before the homogenisation stage, the circuit containing the suspension and the circuit containing the liquid composition. Care is taken that the pump supplying the suspension can generate enough pressure to allow all of the suspension to be injected into the liquid composition.

After the homogenisation stage, the resulting product of this mixture is pasteurised with a time/temperature combination which makes it possible, on one hand to reduce the initial microbe content, and, on the other hand, to increase the texturing capacity of the thickeners (in the case of starch), to keep the fine phytosterol particles in solution.

The two flows can be adjusted, in regard to the quantity of suspension to be introduced. For example, if one wishes to add 2% of biologically active powder to the finished product and that this is done by the intermediary of a suspension containing 25% of this powder, the flow of the suspension must be 8% of the flow of the liquid composition.

The homogenisation pressure can vary between 50 and 500 bars. Below this level, the cutting action is not enough to properly reduce the size of the phytosterol particles (or substances) and ensure thorough mixture with the liquid composition. Above this amount, the device is damaged. The intensity of the applied heat treatment is generally between 85° C. and 130° C. for 30 seconds to 8 minutes.

According to one of the methods of carrying out the process of the invention, at the end of the homogenisation stage, the stable homogenised dispersion is pasteurised at a temperature from about 85° C. to about 130° C., then cooled to a temperature of about 4° C. to about 45° C.

In the invention process, at the end of the pasteurisation stage, the pasteurised stable homogenised dispersion is cultured at about 35° C. to about 45° C., which allows optimal development of lactic bacteria, then it is fermented.

The culture with lactic bacteria makes it possible to make yoghurts and fermented milk and to proceed to lactic fermentation according to methods known to an expert.

According to another method of carrying out the invention, at the end of the homogenisation stage, the stable homogenised dispersion is sterilised at a temperature of about 90° C. to about 130° C., then it is cooled at a temperature of about 70° C. to about 4° C.

This process makes it possible to obtain sweetened food compositions.

It is in fact possible to add excipients known to the expert to the homogenised dispersion mentioned above, such as those chosen from aromatising agents, sweeteners or colorants.

The invention equally concerns an emulsifier free food composition, likely to be obtained by the process described above.

DIAGRAMS

FIG. 1 represents a schematic method of the invention.

The vat containing the phytosterol suspension is represented by (1).

The pump sending the phytosterol suspension is symbolised by P2 and represented by (2); it makes it possible to regulate the flow of the phytosterol suspension.

The vat containing the fluid composition (mix) is represented by (3) and the pump sending the fluid composition (symbolised by P1) by (4), which makes it possible to regulate the flow.

In (5) the pre-heater of the fluid composition is shown (heat treatment to a temperature of 60 to 80° C. to allow thorough homogenisation).

The phytosterol suspension and the liquid composition are mixed just after the pre-heating of the liquid composition and just before the homogenisation stage of the mixture, with the aid of a homogeniser which makes it possible to reduce the phytosterol particle size to an measurement of about 50µ to about 100µ.

After the homogenisation stage, the product resulting from the mixture
is either pasteurised using a time/temperature combination which allows, on one hand, to suppress the microbe content and, on the other hand, to increase the texturing capacity of the thickeners,
or it is sterilised at a temperature of about 90° C. to about 130° C., for about 1 min, then cooled to a temperature of about 50° C. to about 4° C.

EXAMPLES

Example 1

Preparation of Skimmed Yoghurt with 0.5% β-Sitosterol

Ten percent of β-sitosterol is placed in suspension in water with 0.3% xanthan added. Manual homogenisation with the aid of a whisk makes it possible to obtain a pumpable paste. The paste obtained is injected into the the liquid composition circuit (mix) prepared following the following formula:

| | |
|---|---|
| milk at 0% fat | 95% |
| skimmed milk powder | 3% |
| modified starch | 2%. |

The flow from the injection pump, P2 of the paste is set to 5% of the pump flow, P1 carrying the liquid composition (mix). The two circuits join together to be homogenised in H1 at a temperature of 75° C. and at a pressure of 200 bars (Rannie homogeniser). The obtained mixture is pasteurised for 10 minutes at 95° C., then cooled at 45° C. on the E1 exchanger. The whole thing is recovered in a sterile container. It is cultured with a culture of lactic fermenting agents, and it is fermented until a pH of 4.5 is obtained. The product is then mixed, cooled in a plate exchanger, then packaged in individual pots. The product obtained, in this way can also be mixed with a fruit preparation before being packaged or measured out on top of a fruit preparation at the time of treatment.

Example 2

Preparation of a Cream Desert Containing 0.5% β-Sitosterol

The aqueous suspension of β-sitosterol is prepared according to the method described in example 1. The paste obtained in this way is injected as described in example 1.

However, the homogenisation pressure is reduced here to 50 bars, and the composition of the liquid composition (mix) is the following:

| | |
|---|---|
| milk with 0% fat | 67.92% |
| cream with 40% fat | 12% |
| carrageenans | 0.05% |
| modified starch | 4.0% |
| skimmed milk powder | 4% |
| sugar | 12% |
| vanilla flavouring | 0.01% |
| colouring agent | 0.01% |

A heat treatment at 130° C. is then applied for 1 minute on E1, then it is cooled to 10° C. before packaging in individual pots.

Cocoa can equally be added to the liquid composition (mix) to obtain a chocolate cream.

Example 3

Preparation of Whole Yoghurt (3.7% fat) 0.8% β-Sitostanol

Fifteen percent of β-sitostanol is placed in suspension in water with 0.3% xanthan and (5%) oil added, then manually homogenised with the aid of a whisk. This results in a pumpable paste.

The paste is injected into the circuit of the liquid composition (mix) prepared according to the following formula:

| | |
|---|---|
| whole milk | 95% |
| skimmed milk powder | 3% |
| modified starch | 2% |

The flow of the injection pump P2 of the paste is set to 5.33% of the flow of the pump P1 carrying the liquid composition. The two circuits join together to be homogenised at a temperature of 75° C. and at a pressure of 200 bars (Rannie homogeniser). The mixture is pasteurised for 10 minutes at 95° C., then cooled at 45° C. in E1.

The whole thing is recovered in a sterile container. It is cultured with a culture of lactic fermenting agents, and the fermentation is carried out until a pH of 4.5 is obtained. The product is then mixed, then cooled in a plate exchanger, then packaged in individual pots.

The thus obtained product can also be mixed with a fruit preparation before being packaged or measured out on a fruit preparation at the time of packaging.

Example 4

Preparation of a Vegetable Product Enriched with β-Sitosterol

The aqueous suspension of β-sitosterol is prepared following the method described in example 1. The thus obtained paste is injected as described in example 1, into the liquid composition; but, the milk is substituted by a liquid vegetable preparation with a cereal base like oats, barley, rice, wheat or by soya milk, or by a mixture of the two. The skimmed milk powder can also be replaced by a powder of soya protein or oat powder.

Either 100% vegetable fermented products, or 100% vegetable cream deserts are obtained in this way.

Example 5

Preservation of β-Sitosterol in the Products

Yoghurt, target=0.45% of β-sitosterol, measurement into pots

| T + 0 day: | 0.42%, 0.41% |
| T + 15 days: | 0.42%, 0.42% |
| T + 30 days: | 0.42%, 0.41% |

Cream desert target=0.50% of β-sitosterol, measurement into pots

| T + 0 day: | 0.47%, 0.47% |
| T + 15 days: | 0.49%, 0.49% |
| T + 30 days: | 0.51%, 0.52% |

Yoghurt, target=0.4% of β-sitostanol, measurement into pots:

| Start of production: | 0.31% |
| End of production: | 0.38% |

The expected values are close to the theoretical values. In addition, the product remains stable during the process, as well as during the preservation of the product.

These products have been made in comparison to a control product not containing phytositosterol. Eating these products gives rise to a slightly powdery, but entirely acceptable sensation thanks to the phytositosterol. The intensity of the flavour is not affected.

The invention claimed is:

1. A stable emulsifier-free food composition, consisting essentially of a water content of at least 60%, a fat content of less than about 20%, and from about 0.001 to about 7.5% of a substance which is hydrophobic and/or has a melting point greater than about 130° C., wherein the balance of said composition is one or more additional emulsifier-free food-grade edible components selected from the group consisting of thickeners, aromatizing agents, sweeteners, colorants, and combinations thereof.

2. The stable emulsifier-free food composition according to claim 1, wherein said substance is selected from the group consisting of phytosterols, phytostanols and esterified derivatives of phytosterols and phytostanols.

3. The stable emulsifier-free food composition according to claim 1, wherein said substance has a granulometry of about 60 μm to about 1 mm.

4. The stable emulsifier-free food composition according to claim 1, wherein the fat content is less than 18%.

5. The stable emulsifier-free food composition according to claim 1, wherein said substance is present in an amount from about 0.05 to about 4%.

6. The stable emulsifier-free food composition according to claim 1, wherein said substance is present in an amount from about 0.05 to about 2.5%.

7. An emulsifier-free food composition, comprising a water content of at least 60%, a fat content of less than about 20%, and from about 0.001 to about 7.5% of a substance which is hydrophobic and/or has a melting point greater than about 130° C., wherein the balance of said composition is one or more additional emulsifier-free food-grade edible components selected from the group consisting of thickeners, aromatizing agents, sweeteners, colorants, and combinations thereof.

8. The emulsifier-free food composition according to claim 7, wherein said substance is selected from the group consisting of phytosterols, phytostanols and esterified derivatives of phytosterols and phytostanols.

9. The emulsifier-free food composition according to claim 7, wherein said substance has a granulometry of about 60 μm to about 1 mm.

10. The emulsifier-free food composition according to claim 7, wherein the fat content is less than 18%.

11. The emulsifier-free food composition according to claim 7, wherein said substance is present in an amount from about 0.05 to about 4%.

12. The emulsifier-free food composition according to claim 7, wherein said substance is present in an amount from about 0.05 to about 2.5%.

13. A stable emulsifier-free food composition, comprising a water content of at least 60%, a fat content of less than about 20%, and from about 0.001 to about 7.5% of a substance selected from the group consisting of phytosterols, phytostanols and esterified derivatives of phytosterols and phytostanols,
wherein said substance has a granulometry of 60 μm to about 1 mm, and
wherein the balance of said composition is one or more additional emulsifier-free food-grade edible components selected from the group consisting of thickeners, aromatizing agents, sweeteners, colorants, and combinations thereof.

14. The stable emulsifier-free food composition according to claim 13, wherein said emulsifier-free food composition contains a fat content less than 18%.

15. The stable emulsifier-free food composition according to claim 13, wherein said substance is present in an amount from about 0.05 to about 4%.

16. The stable emulsifier-free food composition according to claim 13, wherein said substance is present in an amount from about 0.05 to about 2.5%.

* * * * *